(12) United States Patent
Delin et al.

(10) Patent No.: US 7,525,476 B1
(45) Date of Patent: Apr. 28, 2009

(54) SYSTEM AND METHOD FOR FILLING LEVEL DETERMINATION

(75) Inventors: Håkan Delin, Linköping (SE); Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 11/938,995

(22) Filed: Nov. 13, 2007

(51) Int. Cl.
| | |
|---|---|
| G01F 23/284 | (2006.01) |
| G01S 7/40 | (2006.01) |
| G01S 13/08 | (2006.01) |
| G01S 13/00 | (2006.01) |
| G01F 23/28 | (2006.01) |
| G01F 23/00 | (2006.01) |

(52) U.S. Cl. ............ 342/124; 342/118; 342/165; 342/173; 342/174; 342/175; 342/195; 73/290 R; 73/304 R; 324/600; 324/629; 324/637; 324/642

(58) Field of Classification Search ............ 342/118, 342/120–124, 165, 173–175, 192–197, 128–145; 324/600, 629, 637, 638–646; 73/290 R, 73/290 V, 304 R, 304 C, 305, 306, 311, 290 B
See application file for complete search history.

(56) References Cited

U.S. PATENT DOCUMENTS

| | | | | |
|---|---|---|---|---|
| 3,750,012 | A * | 7/1973 | Fellers et al. | 324/642 |
| 4,044,353 | A * | 8/1977 | Levy | 342/124 |
| 4,210,023 | A * | 7/1980 | Sakamoto et al. | 73/290 R |
| 4,254,482 | A * | 3/1981 | Newman | 342/124 |
| 4,470,299 | A * | 9/1984 | Soltz | 73/290 V |

(Continued)

FOREIGN PATENT DOCUMENTS

EP    0138541 A1 *  4/1985

(Continued)

OTHER PUBLICATIONS

"International Search Report" dated Jan. 28, 2009 for corresponding application Serial No. PCT/SE2008/051301.

Primary Examiner—Bernarr E Gregory
(74) Attorney, Agent, or Firm—Westman, Champlin & Kelly, P.A.

(57) ABSTRACT

A method for determining a filling level of a product contained in a tank, by means of a radar level gauge system comprising a transceiver for generating, transmitting and receiving electromagnetic signals; a probe connected to the transceiver and arranged to guide a transmitted electromagnetic signal from the transceiver towards and into the product inside the tank, and to return a reflected electromagnetic signal resulting from reflection of the transmitted electromagnetic signal by a surface of the product back towards the transceiver; and a plurality of reference reflectors each being arranged at a respective known position along the probe and being configured to reflect a portion of the transmitted electromagnetic signal back towards the transceiver. The method comprises the steps of identifying, based on received electromagnetic signals reflected by the reference reflectors, a set of reference reflectors located above the surface of the product; selecting first and second reference reflectors comprised in the set of reference reflectors; determining a propagation velocity compensation factor based on a known distance between the first and second reference reflectors and a distance therebetween determined using received electromagnetic signals reflected by the first and second reference reflector, respectively; and determining the filling level based on a received electromagnetic signal reflected by the surface of the product, and the propagation velocity compensation factor.

30 Claims, 5 Drawing Sheets

U.S. PATENT DOCUMENTS

| | | | |
|---|---|---|---|
| 4,665,403 A * | 5/1987 | Edvardsson | 342/124 |
| 5,053,775 A * | 10/1991 | Mawhinney et al. | 342/124 |
| 5,095,748 A * | 3/1992 | Gregory et al. | 73/290 V |
| 5,249,463 A | 10/1993 | Willson et al. | |
| 5,765,433 A | 6/1998 | Johnson | |
| 6,184,818 B1 | 2/2001 | Meinel | 342/124 |
| 6,295,018 B1 | 9/2001 | Diede et al. | 342/124 |
| 6,559,657 B1 | 5/2003 | McCarthy et al. | |
| 6,626,038 B1 * | 9/2003 | Carsella et al. | 73/290 R |
| 6,867,729 B2 | 3/2005 | Berry et al. | 342/124 |
| 7,075,479 B2 | 7/2006 | Andersson | 342/124 |
| 7,088,285 B2 * | 8/2006 | Smith | 342/124 |
| 2005/0024259 A1 * | 2/2005 | Berry et al. | 342/124 |
| 2005/0241391 A1 * | 11/2005 | Kull | 73/290 V |
| 2005/0264440 A1 * | 12/2005 | Smith | 342/124 |

FOREIGN PATENT DOCUMENTS

| | | |
|---|---|---|
| EP | 1 801 549 A2 | 12/2006 |
| WO | WO92/14996 A1 * | 9/1992 |
| WO | WO 2007/049966 | 5/2007 |

\* cited by examiner

SYSTEM AND METHOD FOR FILLING LEVEL DETERMINATION

TECHNICAL FIELD OF THE INVENTION

The present invention relates to a radar level gauge system, for determination of a filling level of a product contained in a tank, and to a method for achieving such a filling level determination.

TECHNICAL BACKGROUND

Radar level gauge systems are in wide use for measuring process variables of a product contained in a tank, such as filling level, temperature, pressure etc. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged vertically from top to bottom of the tank. The electromagnetic signals are subsequently reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity along the probe of the electromagnetic signals.

This propagation velocity is determined by various factors, such as the configuration of the probe and environmental conditions inside the tank. Such environmental conditions, for example, include the composition of the atmosphere above the surface of the product contained in the tank, and product residue which may have adhered to the probe as the filling level of the product changes inside the tank.

U.S. Pat. No. 6,867,729 and U.S. Pat. No. 5,249,463 disclose different systems designed to compensate for varying vapor concentrations in the atmosphere above the surface of the product in the tank.

The level measuring system disclosed in U.S. Pat. No. 6,867,729 normally operates at a relatively low gain to determine a material level of material contained in a tank, and periodically operates at a relatively high gain to determine a distance to a target marker provided along the probe above an expected sensing region of the probe. The determined distance to the target marker is used to compensate the determined material level for properties of vapor above the material level.

The level measuring system for measuring a water level disclosed in U.S. Pat. No. 5,249,463 comprises a probe provided with a pair of spaced reference discontinuities above the maximum level of the water. The difference between the measured and the known distance between the reference discontinuities is used to provide a measurement of the water level, that is independent of changes in the dielectric constant of the vapor above it.

Neither of the systems and methods disclosed in the above documents take any account of other factors influencing the propagation velocity along the probe than vapor concentration, and are therefore not suitable for use in situations when other factors, such as probe contamination, dominate.

SUMMARY OF THE INVENTION

In view of the above-mentioned and other drawbacks of the prior art, a general object of the present invention is to provide an improved radar level gauge system and method, and in particular a radar level gauge system and method capable of providing measurement results that are adjusted for environmental conditions in the tank.

According to a first aspect of the present invention, these and other objects are achieved through a method for determining a filling level of a product contained in a tank, by means of a radar level gauge system comprising a transceiver for generating, transmitting and receiving electromagnetic signals; a probe connected to the transceiver and arranged to guide a transmitted electromagnetic signal from the transceiver towards and into the product inside the tank, and to return a reflected electromagnetic signal resulting from reflection of the transmitted electromagnetic signal by a surface of the product back towards the transceiver; and a plurality of reference reflectors each being arranged at a respective known position along the probe and being configured to reflect a portion of the transmitted electromagnetic signal back towards the transceiver. The method comprises the steps of identifying, based on received electromagnetic signals reflected by the reference reflectors, a set of reference reflectors located above the surface of the product; selecting first and second reference reflectors comprised in the set of reference reflectors; determining a propagation velocity compensation factor based on a known distance between the first and second reference reflectors and a distance therebetween determined using received electromagnetic signals reflected by the first and second reference reflector, respectively; and determining the filling level based on a received electromagnetic signal reflected by the surface of the product, and the propagation velocity compensation factor.

It should be noted that the method according to the present invention is by no means limited to performing the steps thereof in any particular order.

In the context of the present application, the "probe" is a waveguide designed for guiding electromagnetic signals. Several types of probes, for example single-line (Goubau-type), and twin-line probes may be used. The probes may be essentially rigid or flexible and they may be made from metal, such as stainless steel, plastic, such as PTFE, or a combination thereof.

The "transceiver" may be one functional unit capable of transmitting and receiving electromagnetic signals, or may be a system comprising separate transmitter and receiver units.

The tank may be any container or vessel capable of containing a product, and may be metallic, or partly or completely non-metallic, open, semi-open, or closed.

Each reference reflector may be implemented as a structure capable of reflecting electromagnetic signals traveling along the probe and may be achieved by means of a structure external to the probe, an internal structure in the probe, or a combination thereof. Furthermore, different reference reflectors may be provided as identical or different reflecting structures.

That the position of each of the reference reflectors is "known" means that the position has been previously determined by means of any suitable measurement technique. For example, the position may be determined based on received electromagnetic signals reflected by the respective reference reflectors, but under controlled conditions, such as during production of the radar level gauge system or when the system is installed but the probe is clean and the tank empty.

Furthermore, the reference reflectors may be regularly or irregularly spaced with a spacing that may typically be around 1-2 m. Especially in the case of a relatively long probe, such as a probe longer than, say, 15-20 m, it may be advantageous to arrange the reference reflectors to be irregularly spaced along the probe so as to avoid interference effects.

In the context of the present application, the reference reflectors should be understood to be irregularly spaced if the standard deviation of the distances between adjacent reference reflectors is larger than a quarter of the achievable distance resolution of the radar level gauge system.

For an exemplary radar level gauge system of pulsed GWR type having a pulse length of 1 ns, the resolution in distance is about 150 mm, that is, for discrimination of two adjacent echo signals to be enabled, these echo signals should result from reflections at impedance transitions which are spaced apart by at least 150 mm. For such a system, the above-mentioned standard deviation should therefore be at least 150/4=37.5 mm. In practice, the standard deviation should preferably be slightly larger, such as above 50 mm, especially for a long probe (longer than about 20 m) having a large number (more than about 20) of reference reflectors.

This will effectively reduce the effect of co-operation between reflections from different reference reflectors and multiple reflections, and will allow a smaller spacing and/or a larger number of reflectors.

The present invention is based on the realization that the accuracy of filling level measurements can be improved using a compensation factor obtained based on a measured distance and a known distance between two reference reflectors located above the surface of the product to be gauged. The present inventors have, furthermore, realized that an improved compensation can be achieved if at least one of these two reference reflectors is positioned at a level in the tank within a range of levels across which the filling level fluctuates during normal use of the tank. Hereby, at least one of the reference reflectors will have been covered by product and an accumulation of product may have occurred on the probe between the two reference reflectors. As a consequence, the effect of probe contamination on the propagation velocity of the electromagnetic signals, in addition to the effect of the presence of vapor above the surface, can be compensated for using the determined propagation velocity compensation factor.

According to one embodiment, it may be ensured that at least one reference reflector will be positioned within the above-mentioned range of levels by providing reference reflectors essentially along the length of the probe.

Furthermore, a concentrated residue—a "lump"—on the probe may cause a disturbance echo which may be difficult to distinguish from the surface echo. Through the present invention it can be determined if an echo is located above the surface of the product and thus may result from a lump adhered to the unsubmerged portion of the probe.

Moreover, measurement of a distance to a product, which is contained in the tank and covered by an upper product can be improved, since the known and measured distances to reference reflectors submerged in the upper product can be used to accurately determine the dielectric constant of the upper product.

The set of reference reflectors located above the surface of the product may be identified based on a difference between a known position and a measured position along the probe of each reference reflector.

For example, the time between transmission of an electromagnetic signal and receipt of its reflection at a particular reference reflector can be used to determine the measured position of that reference reflector. When determined in this manner, the measured distance to, and consequently the measured position of, the reference reflector is dependent on the propagation velocity of the electromagnetic signal along the probe. If a certain reflector is submerged in the product, the propagation velocity for the submerged portion of the probe will be considerably lower than for the unsubmerged portion of the probe. Accordingly, the difference between the measured position and the known position will be considerably larger for a submerged reference reflector than for an unsubmerged reflector. Alternatively, the difference between measured and known distances between neighboring reference reflectors may be used to identify which reference reflectors are submerged for a certain filling level in the tank.

Furthermore, the first reference reflector may advantageously be selected as the reference reflector in the above-mentioned set of reference reflectors which is located the closest to the surface of the product. In other words, the first reference reflector may be selected as the unsubmerged reference reflector closest to the surface of the product.

Through this selection, the compensation factor can be determined based on the conditions in the tank as close as possible to the surface of the product. This may often result in a more accurate compensation especially in the case of the probe being contaminated by the product, since the contamination by the product, for example a layer of oil or other substance, may well be non-uniform along the probe.

Additionally, this selection may also result in more accurate measurement results for cases when the vapor present in the tank is unevenly distributed.

According to one embodiment, the second reference reflector may be selected as the unsubmerged reference reflector closest to the first reference reflector, whereby the closest possible approximation of the measurement conditions (such as probe contamination, vapor concentration etc) between the first reference reflector and the surface of the product can be obtained.

According to another embodiment, the second reference reflector may be selected as a reference reflector located relatively far above the first reference reflector in order to obtain a more accurate compensation factor in case of a homogeneous vapor distribution in the tank and/or a homogenous distribution of product on the probe. For example, the second reference reflector may be the reference reflector closest to the tank ceiling, or the impedance transition at the connection between transceiver and probe can be selected as the second reference reflector.

Advantageously, furthermore, a compensated distance to the surface of the product may be obtained by determining an adjusted distance between the first reference reflector and the surface and adding the adjusted distance to a known distance to the first reference reflector.

It is understood that each of the distances referred to above is determined from a reference position in the vicinity of the transceiver, such as an impedance transition at the connection between transceiver and probe, or the tank ceiling, the process seal, the connection flange, etc.

By using the known distance to the first reference reflector and only compensating with respect to propagation velocity for a relatively short distance along the probe, the sensitivity to errors in the determination of the compensation factor can be kept at a low level.

In order to facilitate analysis of an echo profile obtained from the returned reflected signals received by the transceiver, the reference reflector echoes, or reference echoes, resulting from reflections at the reference reflectors may be subtracted from the echo profile. This may be useful, since the reference echoes may well be of the same order of magnitude as the surface echo resulting from electromagnetic signals reflected by the surface of the product in the tank.

According to a second aspect of the present invention, the above-mentioned and other objects are achieved by a radar level gauge system, for determination of a filling level of a product contained in a tank. The radar level gauge system comprises a transceiver for generating, transmitting and receiving electromagnetic signals; a probe connected to the transceiver and arranged to guide a transmitted electromagnetic signal from the transceiver towards and into the product inside the tank, and to return a reflected electromagnetic signal resulting from reflection of the transmitted electromagnetic signal by a surface of the product back towards the transceiver. The radar level gauge system further comprises a plurality of reference reflectors each being arranged at a respective known position along the probe and being configured to reflect a portion of the transmitted electromagnetic signal back towards the transceiver, wherein the plurality of reference reflectors comprises: a first reference reflector located above the surface and at a level in the tank within a range of levels, over which range the filling level fluctuates during normal use of the tank; and a second reference reflector located at a known distance above the first reference reflector; and processing circuitry connected to the transceiver for determining the filling level based on received electromagnetic signals reflected by the surface of the product and the first and second reference reflectors, respectively, and the known distance between the first and second reference reflectors.

As discussed above in connection with the first aspect of the present invention, the first reference reflector and a portion of the probe above the first reference reflector will generally previously have been submerged in the product in the tank, and may thus have been contaminated by a layer of the product. Through the provision of this first reference reflector, a more accurate filling level determination is enabled, since such determination can be compensated for any probe contamination as well as for the vapor concentration in the atmosphere in the tank.

The typical range of levels across which the filling level fluctuates during normal use is, as is well known for a man of ordinary skill in the art, from 0% to 90% of the total height of the tank.

To facilitate discrimination of an electromagnetic signals reflected by a reference reflectors from the electromagnetic signal reflected by the surface of the product, each reference reflector may advantageously comprise an upper portion providing a first impedance transition to a higher impedance for the transmitted electromagnetic signal; and a lower portion providing a second impedance transition to a lower impedance for the transmitted electromagnetic signal, the upper and lower portions being separated along the probe by a distance selected such that an electromagnetic signal reflected by the first impedance transition and an electromagnetic signal reflected by the second impedance transition together form a composite reflected electromagnetic signal having a positive portion and a negative portion, thereby facilitating discrimination of received electromagnetic signals reflected by the reference reflectors.

A reflection of a transmitted electromagnetic signal having a certain polarity, such as a "positive" pulse, at a transition to a lower impedance will have the same polarity as the transmitted electromagnetic signal, and a reflection at a transition to a higher impedance will have opposite polarity. Electromagnetic signals reflected by such opposite impedance transitions, that are suitably spaced apart, will consequently result in a composite electromagnetic signal having portions of opposite polarity. This will make such signals easily distinguishable from a signal reflected by the surface of the product, since the surface typically provides a single isolated impedance transition (typically to a lower impedance).

A suitable distance between the upper and lower portions is related to the pulse time, and for a 1 ns pulse, a distance of about 100 mm will yield an easily distinguishable composite electromagnetic signal. It should, however, be understood that there is a range of distances around this exemplifying distance that will serve the same purpose.

Further embodiments of, and effects obtained through this second aspect of the present invention are largely analogous to those described above for the first aspect of the invention.

According to a third aspect of the present invention, the above-mentioned and other objects are achieved by a radar level gauge system, for determination of a filling level of a product contained in a tank. The radar level gauge system comprises a transceiver for generating, transmitting and receiving electromagnetic signals; a probe connected to the transceiver and arranged to guide a transmitted electromagnetic signal from the transceiver towards and into the product inside the tank, and to return a reflected electromagnetic signal following reflection at a surface of the product back towards the transceiver. The radar level gauge system further comprises a plurality of reference reflectors each being arranged at a respective known position along the probe and being configured to reflect a portion of the transmitted electromagnetic signal back towards the transceiver, wherein each of the reference reflectors has: an upper portion providing a first impedance transition to a higher impedance for the transmitted electromagnetic signal; and a lower portion providing a second impedance transition to a lower impedance for the transmitted electromagnetic signal, the upper and lower portions being separated along the probe by a distance selected such that an electromagnetic signal reflected by the first impedance transition and an electromagnetic signal reflected by the second impedance transition together form a composite reflected electromagnetic signal having a positive portion and a negative portion; and processing circuitry connected to the transceiver for determining the filling level based on received electromagnetic signals reflected by the surface, and by least a first reference reflector comprised in the plurality of reference reflectors.

Various embodiments of, and effects obtained through this third aspect of the present invention are largely analogous to those described above for the first and second aspects of the invention.

BRIEF DESCRIPTION OF THE DRAWINGS

These and other aspects of the present invention will now be described in more detail, with reference to the appended drawings showing a currently preferred embodiment of the invention, wherein:

FIG. 1b is a schematic illustration of the measurement electronics unit comprised in the radar level gauge system in FIG. 1a;

FIG. 1c is a schematic cross-section view of a portion of the probe comprised in the radar level gauge system in FIG. 1a;

FIG. 2b schematically illustrates an echo signal obtained from reflection at the reference reflector in FIG. 2a;

FIG. 4a is a diagram that schematically illustrates an exemplary echo profile obtained by the radar level gauge system in FIG. 1a;

DETAILED DESCRIPTION OF A PREFERRED EMBODIMENT OF THE INVENTION

In the present detailed description, various embodiments of the radar level gauge system according to the present invention are mainly discussed with reference to a pulsed guided wave radar (GWR) level gauge system utilizing a rigid single line (or Goubau) probe. It should be noted that this by no means limits the scope of the present invention, which is equally applicable to various other kinds of probes, such as two-lead probes, flexible probes, etc.

Furthermore, reference is mainly made to filling level determination by means of measuring the time between transmitted and reflected pulses. As is, however, evident to the person skilled in the relevant art, the teachings of the present invention are equally applicable to radar level gauge systems utilizing phase information for determining the filling level through, for example, frequency-modulated continuous wave (FMCW) measurements. When pulses modulated on a carrier are used, phase information can also be utilized.

Figure 1A:
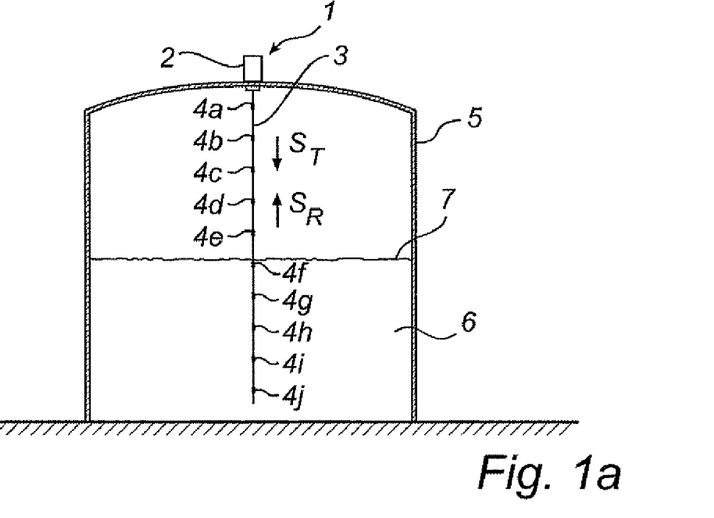
FIG. 1a schematically illustrates a radar level gauge system according to an embodiment of the present invention installed in an exemplary tank.

FIG. 1a schematically illustrates a radar level gauge system 1 according to an embodiment of the present invention, comprising a measurement electronics unit 2, and a probe 3 having a plurality of reference reflectors 4a-j. The radar level gauge system 1 is provided on a tank 5, which is partly filled with a product 6 to be gauged. By analyzing transmitted signals $S_T$ being guided by the probe 3 towards the surface 7 of the product 6, and reflected signals $S_R$ traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner.

Figure 1B:
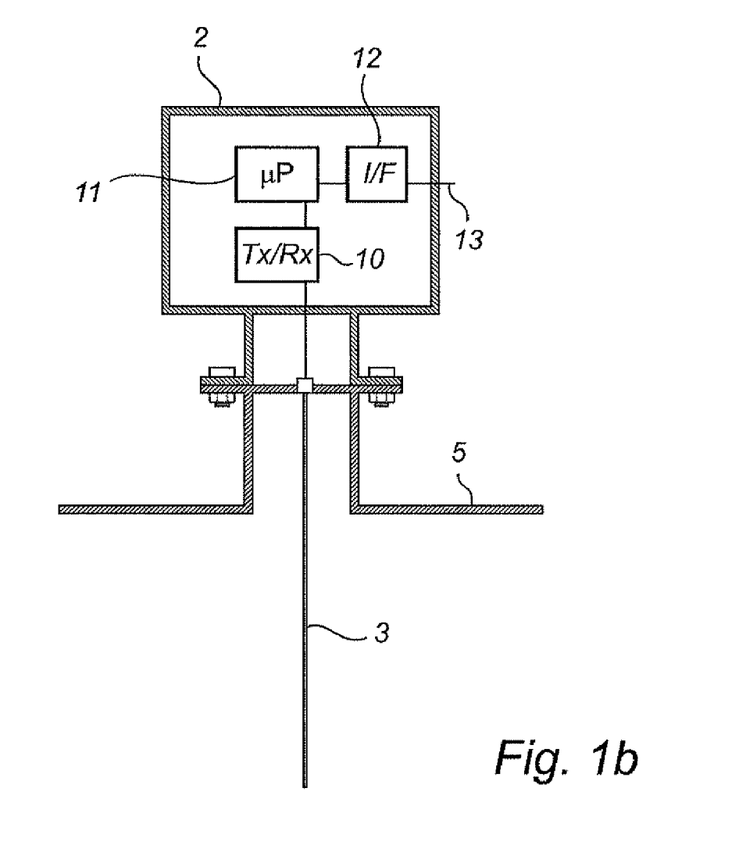

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is, furthermore, connectable to external communication Tines 13 for analog and/or digital communication via an interface 12. Moreover, although not shown in FIG. 1b, the radar level gauge system 1 is typically connectable to an external power source, or may be powered through the external communication lines 13. Alternatively, the radar level gauge system 1 may be configured to communicate wirelessly.

Figure 1C:
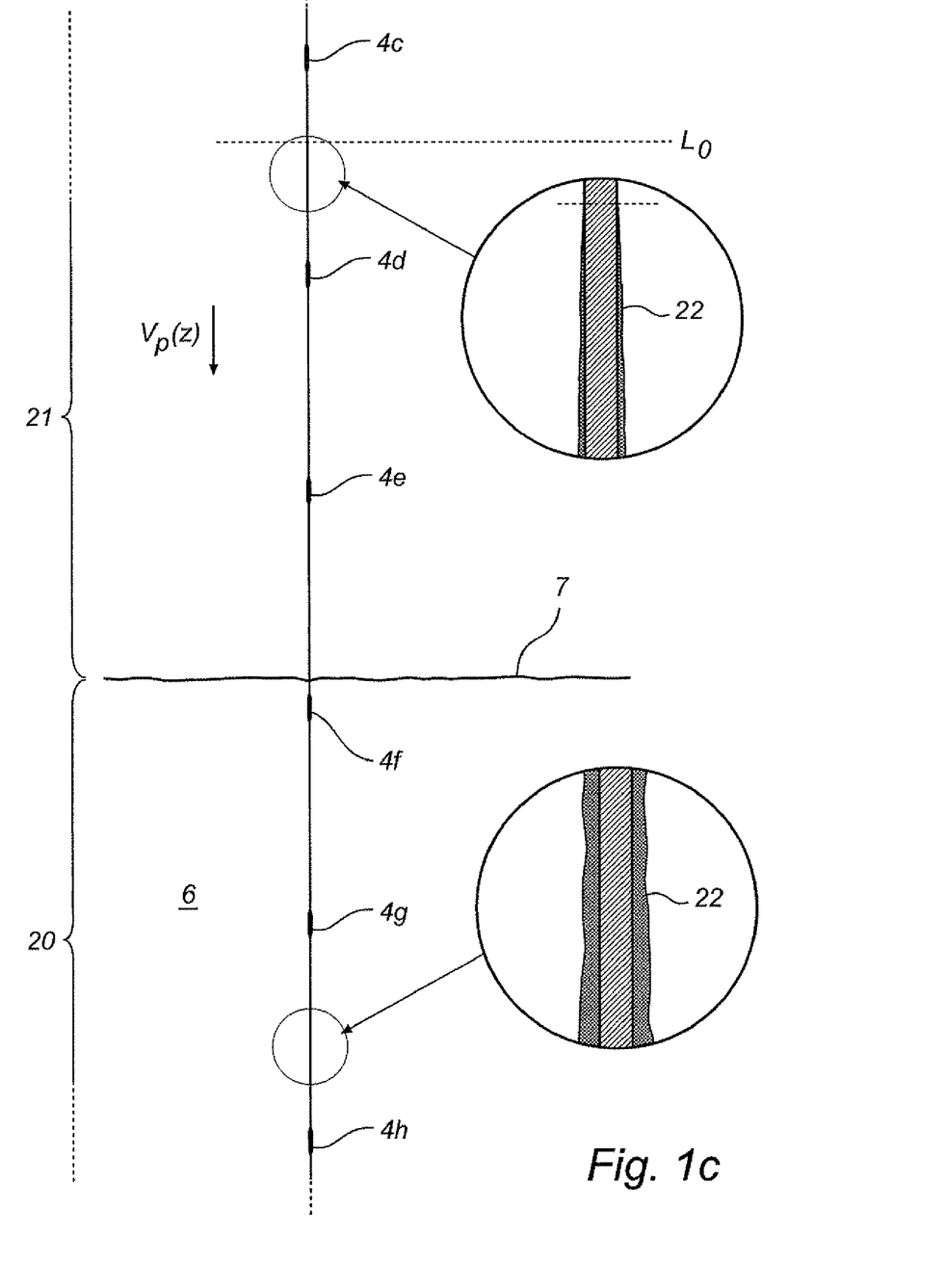

In FIG. 1c, a segment of the probe 3 comprising a submerged portion 20 and an unsubmerged portion 21 is shown. As can be seen in FIG. 1c, the submerged portion 20 of the probe 3 is provided with submerged reference reflectors 4f-j, and the unsubmerged portion 21 of the probe 3 is provided with a set of unsubmerged reference reflectors 4a-i. Due to variations in the filling level of the product 6 in the tank 5, a layer 22 of product 6 may adhere to the probe 3. Evidently, portions of the probe 3 that have never been submerged in the product 6 will have no such layer, while portions that have been alternatingly submerged and unsubmerged in the product 6 may have such a layer 22 formed thereon. This situation is schematically illustrated in FIG. 1c, where a gradually thinner adhered layer 22 of product 6 is shown to exist up to the indicated level $L_0$.

Due to this non-uniform contamination layer 22, the electromagnetic signals traveling along the probe will have a propagation velocity $v_p(z)$ that depends on the position along the probe 3. If not compensated for, this position-dependent propagation velocity $v_p(z)$ may result in a substantial measurement error. However, through the present invention, the relationship between the known positions of reference reflectors provided on the unsubmerged portion 21 of the probe 3 is used to compensate for the layer 22 on the probe 3.

Figure 2A:
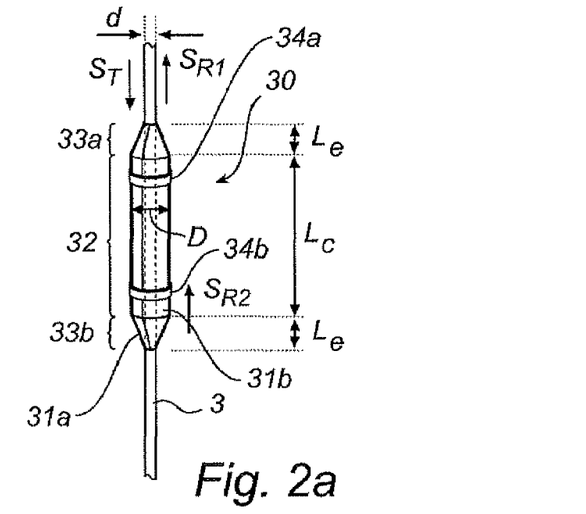
FIG. 2a schematically illustrates an exemplary reference reflector suitable for use in the radar level gauge system according to the present invention.
Figure 2B:
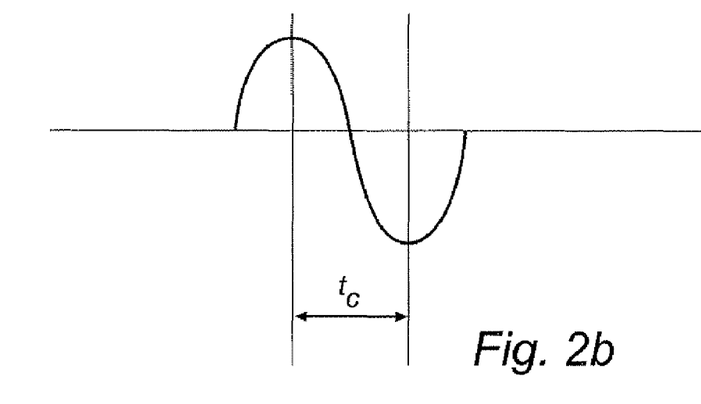

FIGS. 2a-b schematically show a first exemplary reference reflector and a distinguishable echo signal obtained from this reference reflector.

In FIG. 2a, a reference reflector 30 is shown provided on a portion of the probe 3. According to the presently illustrated example, the reference reflector 30 is provided in the form of two halves 31a and 31b, which are clamped to the probe 3 by means of two clamps 34a-b. The reference reflector 30 has an essentially cylindrical portion 32 with a length $L_c$, and first and second essentially frustoconically shaped ends 33a-b that smoothly slope towards the probe 3 and each extends a length $L_e$.

Through the provision of the reference reflector 30 in FIG. 2a, the probe 3 becomes locally thicker and thus locally exhibit a lower impedance. Electromagnetic signals $S_T$ traveling down along the probe 3 will therefore be partly reflected first at the top of the reference reflector 30 and then at the bottom of the reference reflector. The reflection at the top of the reference reflector is the result of reflection at a transition to a lower impedance, and the resulting reflected signal $S_{R1}$ will therefore have the same sign as the incoming signal $S_T$. Analogously, the reflection at the bottom of the reference reflector will result in a reflected signal $S_{R2}$ will having opposite sign/polarity to the incoming signal $S_T$.

The purpose of the sloping ends 33a-b of the reference reflector 30 in FIG. 2a is to avoid ledges on which product 6 in the tank 5 can accumulate and disturb the measurement. Furthermore, the length of each sloping end 33a-b of the reference reflector 30 should be considerably shorter than a pulse length for a pulsed system. For example, in the case of a 1 ns pulse, the pulse length is about 150 mm, and the length $L_e$ of each sloping end 33a-b should be less than about 20 mm. It should be noted that the sloping ends 33a-b may have mutually different lengths and/or shapes.

The diameter of the reference reflector 30 in FIG. 2a is selected such that about 1% of the power of an incoming signal $S_T$ is reflected at each end of the reference reflector.

Moreover, the length $L_c$ of the central portion of the reference reflector 30 is advantageously selected such that the top and bottom reflected signals $S_{R1}$ and $S_{R2}$ combine to form an easily distinguishable wave form.

Exemplary dimensions for the reference reflector 30 in FIG. 2a in order to achieve a suitable reference reflector signal and at the same time reduce the risk of excessive probe contamination, are provided below and ideally result in the waveform schematically shown in FIG. 2b.

Pulsed system–pulse length $t_p$: 1 ns
Probe diameter d: 6 mm
Reference reflector diameter D: 20 mm
Length of cylindrical portion $L_c$: 100-150 mm
Length of sloping portions: $L_e$<20 mm These parameters would typically result in a reflection coefficient of about 0.08 (a 1 mm layer of PTFE would give a reflection coefficient of about 0.14) due to the change of impedance along the probe. Hereby, excessive attenuation of the electromagnetic signals transmitted along the probe 3 is avoided, while at the same time achieving distinguishable signals resulting from reflections at the reference reflectors.

As discussed above, there will be two reflections $S_{R1}$ and $S_{R2}$ which are separated in time and of opposite polarity. By matching the time $t_c$ between the reflected signals $S_{R1}$ and $S_{R2}$ with the pulse length $t_p$, an incoming half period will be reflected as an easily distinguishable full period.

In the exemplary case represented by the parameters given above, the length $L_c$ of the cylindrical portion 32 may, for example, be selected to about 100 mm to yield a full-period curve form, is indicated in FIG. 2b, for the composite reflected signal $S_{R1}+S_{R2}$ for a submerged reference reflector 30 ($t_p$=1 ns corresponds to about 100 mm in a liquid that is transparent for microwave radiation. Alternatively, the length $L_c$ can be selected to about 150 mm to yield a full-period curve form for an unsubmerged reference reflector 30. Obviously, other lengths $L_c$ can be selected for achieving an easily distinguishable composite reflected signal.

In the above, the design of a reference reflector 30 for a pulsed guided wave radar GWR system has been exemplified, in which the length $L_c$ of the reference reflector 30 is related to the pulse length $t_p$ in such a way that an easily distinguishable reflected signal is achieved. For FMCW (Frequency Modulated Continuous Wave) type GWR systems, the length $L_c$ of the reference reflector 30 should instead be related to the center frequency of the frequency sweep characteristic to FMCW-type systems. In particular, the length $L_c$ of the reference reflector 30 should correspond to a quarter of the wavelength at the center frequency of the transmitted signal. For FMCW-type systems, the wavelength of the transmitted signal in the product (in the case of a transparent product) is the most relevant, since a submerged reference reflector 30 can be made practically invisible by properly selecting the dimensions thereof. As an alternative to adapting the length $L_c$ of the reference reflector 30 to achieve the desired invisibility when submerged, the reference reflector can be provided as two separate reflectors that are located a quarter of a wavelength (at the center frequency of the FMCW frequency sweep) apart along the probe.

Above, one exemplary embodiment of a suitable reference reflector has been described with reference to FIG. 2a. Being made of metal and having no steps or edges, this reference reflector embodiment is durable and would not be prone to accumulate excessive amounts of product contamination. However, other designs and material selections are possible and may be preferable depending on the particular application. Below, a number of alternative embodiments will be described and discussed with reference to FIGS. 3a-c.

Figures 3A, 3B:
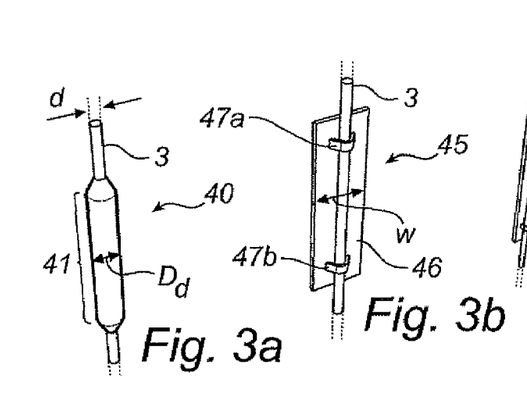
FIGS. 3a-c schematically illustrate various exemplary reference reflectors for use in various embodiments of the radar level gauge system according to the present invention.

According to a first alternative embodiment schematically illustrated in FIG. 3a, the reference reflector 40 may be provided in the form of a dielectric body having essentially the same shape as the reference reflector in FIG. 2a. This dielectric reference reflector 40 may for example be made of PTFE or another suitable dielectric material or combination of materials. Calculations give that the diameter $D_d$ of the central portion 41 of the reference reflector 40 in FIG. 3a can be smaller than is the case for the metal sleeve reference reflector 30 in FIG. 2a. To achieve a corresponding function, the diameter $D_d$ of the dielectric reference reflector 40 may be about 9 to 12 mm for a probe diameter d of 6 mm. Furthermore, the dielectric body may be provided as an integral part adhering to the probe 3 to avoid spaces that might otherwise be infiltrated by the product 6 in the tank 5. For example, the dielectric body can be molded around the probe 3, or the dielectric body can be provided as separated parts, which are then melted and allowed to harden at the desired location along the probe 3.

According to a second alternative embodiment schematically illustrated in FIG. 3b, the reference reflector 45 may be provided in the form of a metallic plate 46 that is attached to the probe by holders 47a-b. Such a metallic plate 46 locally makes the probe 3 thicker in an electrical sense. That is, the impedance of the probe 3 is lower where the plate 46 is. For example, a steel plate having a width W=2 $D_c$ electrically corresponds to the sleeve type reference reflector 30 in FIG. 2a, having a diameter $D_c$. The reference reflector 45 in FIG. 3b is simpler to manufacture and attach but is more sensitive to contamination by the product in the tank.

Figure 3C:
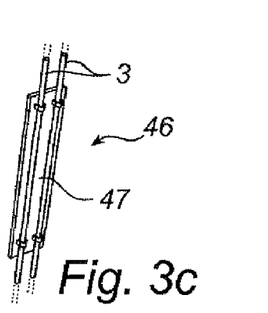

In FIG. 3c, a third alternative embodiment of a reference reflector 47 is schematically illustrated, according to which a metal plate 48 is attached to a two-wire probe 3.

Through the above described reference reflector configurations, the use of reference reflectors for more accurately determining the filling level of a product contained in a tank is facilitated since the echo signals from the reference reflectors can easily be distinguished from the echo signal from reflection at the surface of the product and/or (in the FMCW-case) since the echo signals from the reference reflectors disappear for reference reflectors submerged in the product.

The merits of arranging the reference reflectors to yield easily distinguishable echoes for a pulsed GWR-system will now be illustrated with reference to FIGS. 4a-b.

Figure 4A:
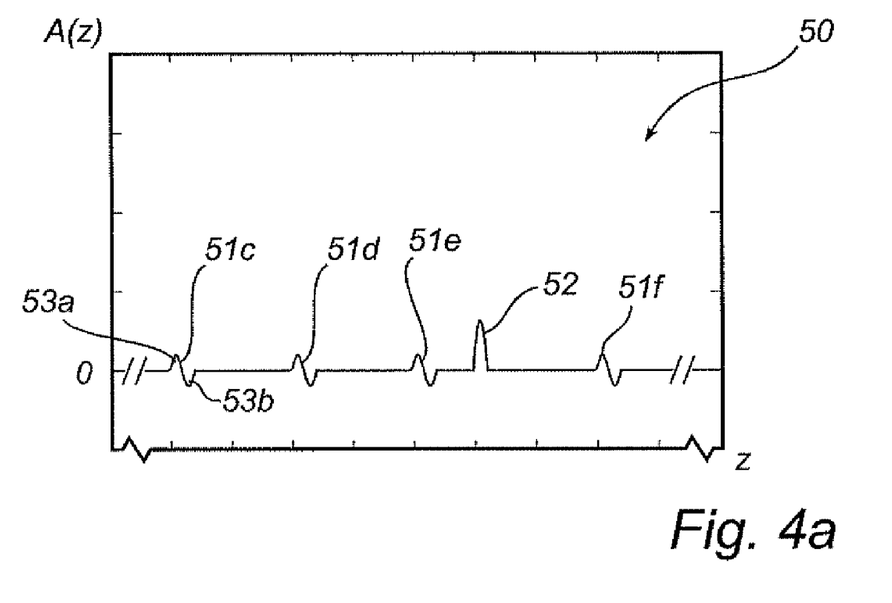

FIG. 4a is a diagram illustrating a typical echo profile 50 where the positions z and amplitudes A(z) of received signals are indicated.

Referring to FIG. 1c, the echo profile 50 includes echoes resulting from reflections at the reference reflectors 4c-f and the surface 7 of the product 6.

As can be seen in FIG. 4a, reference reflector echoes 51c-f resulting from reflections at the reference reflectors 4c-f are distinguishable from the surface echo 52 since each of the reference reflector echoes 51c-f forms a full wave profile with a positive portion 53a and a negative portion 53b and the surface echo only has a positive portion. Note that the surface echo 52 in the exemplary echo profile 50 in FIG. 4 has an amplitude which is in the same order of magnitude as that of the reference echoes.

Figure 4B:
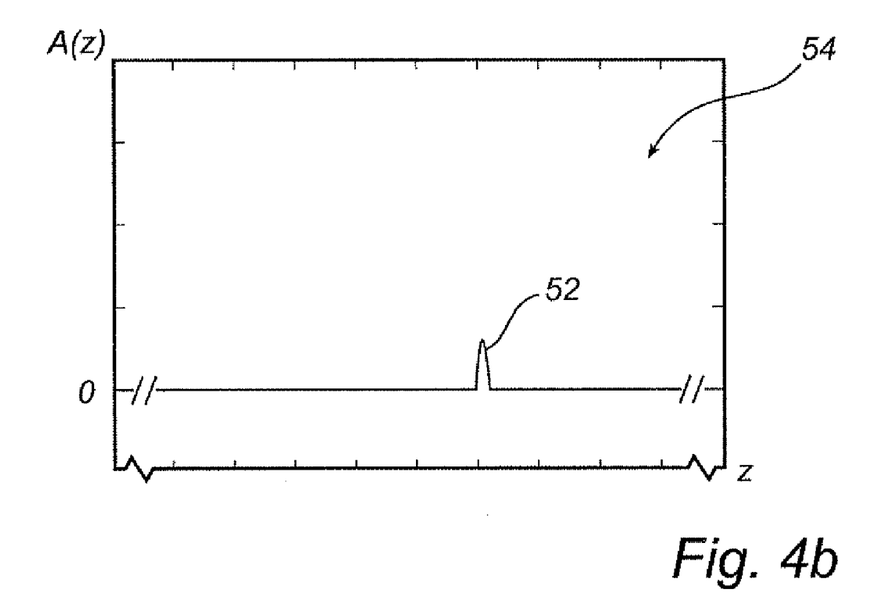
FIG. 4b is a diagram showing the echo profile in FIG. 4a following removal of reference echoes.

The ability to distinguish the reference reflector echoes 51c-f from the surface echo can, for example, be used to remove the reference reflector echoes from the echo profile 50 to form a "clean" echo profile 54, as is schematically illustrated in FIG. 4b.

Figure 5:
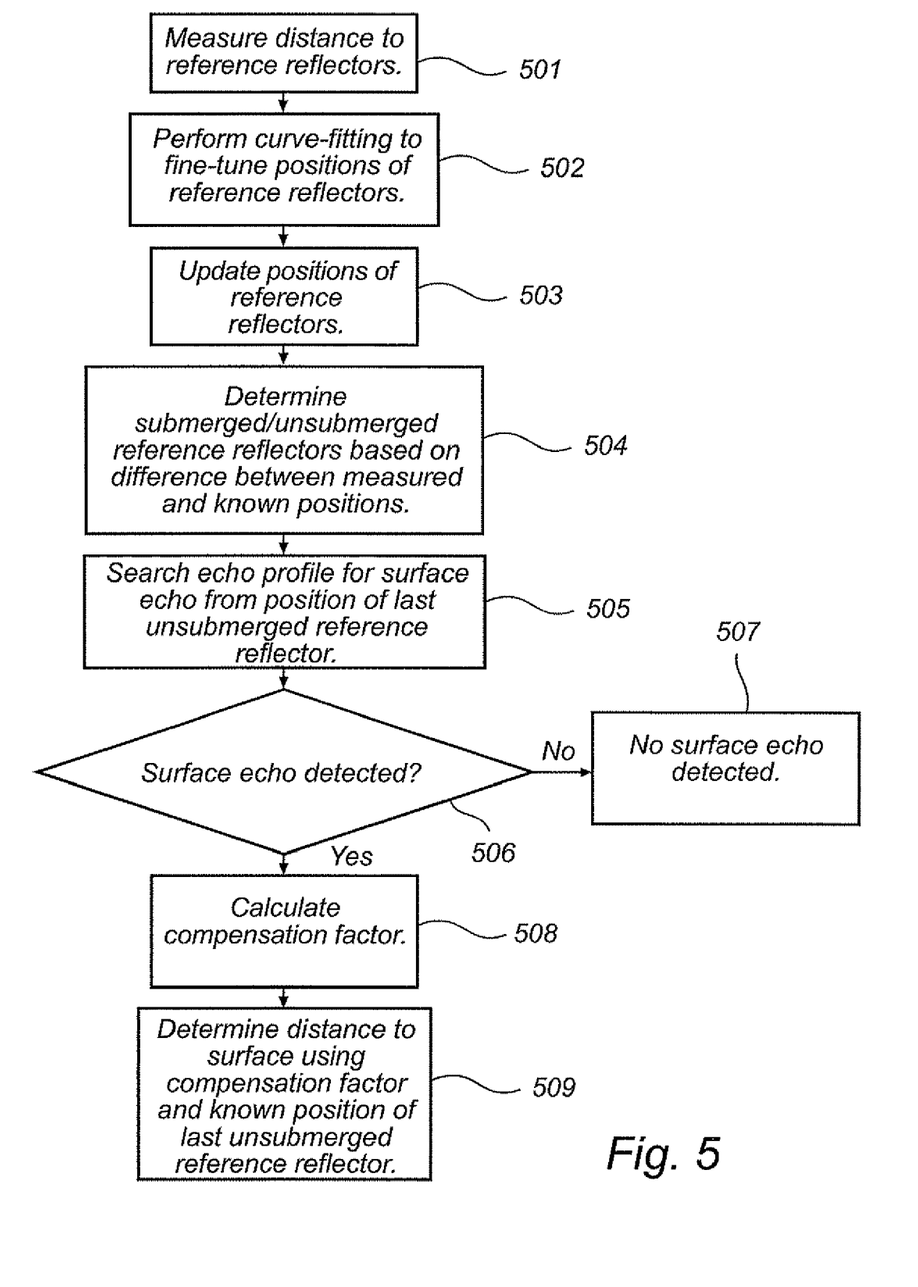
FIG. 5 is a flow-chart schematically illustrating a preferred embodiment of the method according to the present invention.

A preferred embodiment of the filling level determination method according to the present invention will now be described with reference to the flow chart in FIG. 5.

In a first step 501, approximate measured positions of the reference reflectors 4a-j along the probe 3 (referring to FIGS. 1a-c) are determined by searching for the distinguishable reference echoes in the echo profile 50 (referring to FIG. 4a). Thereafter, in step 502, curve-fitting is performed to fine-tune the measured positions of the reference reflectors 4a-j. Subsequently, a table comprising previously measured reference reflector positions is updated with the newly measured reference reflector positions in step 503.

Thereafter, in step 504, the differences between the measured and the known positions of the reference reflectors 4a-j are analyzed to determine which of the reference reflectors 4a-j are submerged in the product 6 and which are not. A large difference between measured and known position of a reference reflector indicates that that reference reflector is submerged in the product 6, since the propagation velocity of the electromagnetic signals along the probe is lower in the product than outside of the product.

The propagation velocity $v_{prop}$ is determined by the following relation:

$$v_{prop} = \frac{v_0}{\sqrt{\varepsilon_r}},$$

where $v_0$ is the propagation velocity of electromagnetic signals along the probe in vacuum; and $\varepsilon_r$ is the relative permittivity of the product.

After thus having identified a set of reference reflectors 4a-e located above the surface 7 of the product 6 in the tank 5, the echo profile 50 is searched in step 505 for a surface echo starting from the position of the unsubmerged reference reflector 4e located the closest to the surface 7, in other words, the last reference reflector above the surface as seen from the transceiver side of the probe 3. In this way, the risk of mistakenly identifying a disturbance echo, such as an echo resulting from reflection at a concentrated "lump" of product adhered to the probe 3 above the surface 7 is virtually eliminated, and the conditions closest to the surface 7 of the product 6 are compensated for.

If it is determined in the next step 506 that a surface echo is not detected, the method proceeds to step 507 to indicate that no surface echo was detected.

If it is determined in step 506 that a surface echo 42 is detected, a compensation factor indicative of the propagation velocity is calculated using echoes from two unsubmerged reference reflectors in step 508. In order to get the closest possible approximation of the conditions with respect to such factor as probe contamination, vapor concentration etc in the vicinity of the surface 7, data for the two unsubmerged reference reflectors 4d and 4e located closest to the surface 7 of the product 6 are preferably used. The compensation factor, or propagation velocity scale factor is calculated using the following relation:

PropScaleFact=[KnownDist(4e)−KnownDist(4d)]/
[ElecDist(4e)−ElecDist(4d)], where:

KnownDist(4e) is the known distance to the unsubmerged reference reflector 4e closest to the surface 7 of the product;

KnownDist(4d) is the known distance to the unsubmerged reference reflector 4d second closest to the surface 7 of the product;

ElecDist(4e) is the measured electrical distance to the unsubmerged reference reflector 4e closest to the surface 7 of the product; and ElecDist(4d) is the measured electrical distance to the unsubmerged reference reflector 4d second closest to the surface 7 of the product.

In the final step 509, the distance to the surface is calculated using the known, distance to the unsubmerged reference reflector 4e located closest to the surface 7, the measured electrical distance to the surface 7 and the compensation factor determined in step 508. The distance to the surface 7 is determined using the following relation:

MeasDistSurface=KnownDist(4e)+PropScaleFact
(ElecDistSurface−ElecDist(4d), where ElecDistSurface is the electrical distance to the surface 7 determined based upon the delay between a transmitted electromagnetic signal and a received signal having been returned following reflection at the surface 7.

The person skilled in the art realizes that the present invention by no means is limited to the preferred embodiments described above. For example, the compensation factor may be determined based on measured and known distances to other reference reflectors above the surface. Moreover, the starting point for the search of the surface echo may be located closer to the transceiver end of the probe. Additionally, the reference echoes may be subtracted from the echo profile to facilitate determination of the surface echo, especially when starting the search for the surface echo from a location close to the transceiver end of the probe.

What is claimed is:

1. A method for determining a filling level of a product contained in a tank, by means of a radar level gauge system comprising:

a transceiver for generating, transmitting and receiving electromagnetic signals;

a probe connected to said transceiver and arranged to guide a transmitted electromagnetic signal from said transceiver towards and into said product inside the tank, and to return a reflected electromagnetic signal resulting from reflection of said transmitted electromagnetic signal by a surface of said product back towards said transceiver; and a plurality of reference reflectors each being arranged at a respective known position along the probe and being configured to reflect a portion of said transmitted electromagnetic signal back towards said transceiver, said method comprising the steps of:

identifying, based on received electromagnetic signals reflected by said reference reflectors, a set of reference reflectors located above said surface of the product;

selecting first and second reference reflectors comprised in said set of reference reflectors;

determining a propagation velocity compensation factor based on a known distance between said first and second reference reflectors and a distance therebetween determined using received electromagnetic signals reflected by said first and second reference reflector, respectively; and determining said filling level based on a received electromagnetic signal reflected by the surface of the product, and said propagation velocity compensation factor.

2. The method according to claim 1, wherein said step of identifying comprises the step of:

for each reference reflector, evaluating a difference between said known position thereof and a position thereof determined using said received electromagnetic signals.

3. The method according to claim 1, wherein said first reference reflector is selected as the reference reflector, in the set of reference reflectors, closest to the surface of the product.

4. The method according to claim 1, wherein said second reference reflector is selected as the reference reflector, in the set of reference reflectors, closest to said first reference reflector.

5. The method according to claim 1, wherein said second reference reflector is selected as the reference reflector, in the set of reference reflectors, most remote from said first reference reflector.

6. The method according to claim 1, wherein said propagation velocity compensation factor is determined as a ratio between said known distance between the first and second reference reflectors and the distance therebetween determined using said received electromagnetic signals.

7. The method according to claim 1, wherein said step of determining the filling level comprises the steps of:
   determining a compensated distance between said first reference reflector and said surface of the product based on a distance therebetween determined using received electromagnetic signals reflected by said first reference reflector and said surface, respectively, and said propagation velocity compensation factor; and
   adding said compensated distance to a known distance between a reference position and said first reference reflector.

8. The method according to claim 1, further comprising the steps of:
   determining an echo profile based on said received electromagnetic signals; and
   subtracting reference echoes resulting from reflection of said transmitted electromagnetic signal by said reference reflectors from said echo profile, thereby facilitating discrimination of a surface echo resulting from reflection of said transmitted electromagnetic signal by the surface of the product.

9. A radar level gauge system, for determination of a filling level of a product contained in a tank, said radar level gauge system comprising:
   a transceiver for generating, transmitting and receiving electromagnetic signals;
   a probe connected to said transceiver and arranged to guide a transmitted electromagnetic signal from said transceiver towards and into said product inside the tank, and to return a reflected electromagnetic signal resulting from reflection of said transmitted electromagnetic signal by a surface of said product back towards said transceiver;
   a plurality of reference reflectors each being arranged at a respective known position along the probe and being configured to reflect a portion of said transmitted electromagnetic signal back towards said transceiver, wherein said plurality of reference reflectors comprises:
      a first reference reflector located above said surface and at a level in said tank within a range of levels, over which range said filling level fluctuates during normal use of said tank; and
      a second reference reflector located at a known distance above said first reference reflector; and
   processing circuitry connected to said transceiver for determining said filling level based on received electromagnetic signals reflected by the surface of the product and the first and second reference reflectors, respectively, and said known distance between the first and second reference reflectors.

10. The radar level gauge system according to claim 9, wherein said second reference reflector is arranged at a level within said range of levels, over which range said filling level fluctuates during normal use of the tank.

11. The radar level gauge system according to claim 9, wherein said first reference reflector is located closest to said surface among reference reflectors located above said surface.

12. The radar level gauge system according to claim 9, wherein said second reference reflector is located closest to said first reference reflector among reference reflectors located above said surface.

13. The radar level gauge system according to claim 9, wherein said second reference reflector is most remote from said first reference reflector among reference reflectors located above said surface.

14. The radar level gauge system according to claim 9, wherein each of said reference reflectors comprises:
   an upper portion providing a first impedance transition to a higher impedance for said transmitted electromagnetic signal; and
   a lower portion providing a second impedance transition to a lower impedance for said transmitted electromagnetic signal,
   said upper and lower portions being separated along the probe by a distance selected such that an electromagnetic signal reflected by said first impedance transition and an electromagnetic signal reflected by said second impedance transition together form a composite reflected electromagnetic signal having a positive portion and a negative portion, thereby facilitating discrimination of received electromagnetic signals reflected by said reference reflectors.

15. The radar level gauge system according to claim 9, wherein said reference reflectors are distributed along substantially an entire extension of said probe.

16. The radar level gauge system according to claim 9, wherein said reference reflectors are irregularly spaced along said probe.

17. The radar level gauge system according to claim 9, wherein said probe is a single line probe, and each of said reference reflectors is provided as an essentially cylindrical structure arranged coaxially on said probe.

18. The radar level gauge system according to claim 17, wherein said essentially cylindrical structure comprises an upper essentially frustoconically shaped portion at an upper end thereof, and a lower essentially frustoconically shaped portion at a lower end thereof.

19. The radar level gauge system according to claim 9, wherein said probe is a single line probe, and each of said reference reflectors is provided as a reflector plate attached to the probe.

20. A radar level gauge system, for determination of a filling level of a product contained in a tank, said radar level gauge system comprising:
   a transceiver for generating, transmitting and receiving electromagnetic signals;
   a probe connected to said transceiver and arranged to guide a transmitted electromagnetic signal from said transceiver towards and into said product inside the tank, and to return a reflected electromagnetic signal following reflection at a surface of said product back towards said transceiver;
   a plurality of reference reflectors each being arranged at a respective known position along the probe and being configured to reflect a portion of said transmitted electromagnetic signal back towards said transceiver,
   wherein each of said reference reflectors has:
      an upper portion providing a first impedance transition to a higher impedance for said transmitted electromagnetic signal; and a lower portion providing a second impedance transition to a lower impedance for said transmitted electromagnetic signal, said upper and lower portions being separated along the probe by a distance selected such that an electromagnetic signal reflected by said first impedance transition and an electromagnetic signal reflected by said second impedance transition together form a composite reflected electromagnetic signal having a positive portion and a negative portion; and processing circuitry connected to said transceiver for determining said filling level based on received electromagnetic signals reflected by said surface, and by least a first reference reflector comprised in said plurality of reference reflectors.

21. The radar level gauge system according to claim 20, wherein said first reference reflector is located above said surface of the product.

22. The radar level gauge system according to claim 21, wherein said first reference reflector is located at a level in said tank within a range of levels, over which range said filling level fluctuates during normal use of said tank.

23. The radar level gauge system according to claim 21, wherein said first reference reflector is located closest to said surface among reference reflectors positioned above said surface.

24. The radar level gauge system according to claim 20, wherein said filling level determination is additionally based on a received electromagnetic signal reflected by a second reference reflector located above said first reference reflector.

25. The radar level gauge system according to claim 24, wherein said second reference reflector is located closest to said first reference reflector among reference reflectors positioned above said surface.

26. The radar level gauge system according to claim 20, wherein said reference reflectors are distributed along substantially an entire extension of said probe.

27. The radar level gauge system according to claim 20, wherein said reference reflectors are irregularly spaced along said probe.

28. The radar level gauge system according to claim 20, wherein said probe is a single line probe, and each of said reference reflectors is provided as an essentially cylindrical structure arranged coaxially on said probe.

29. The radar level gauge system according to claim 28, wherein said essentially cylindrical structure comprises an upper essentially frustoconically shaped portion at an upper end thereof, and a lower essentially frustoconically shaped portion at a lower end thereof.

30. The radar level gauge system according to claim 20, wherein said probe is a single line probe, and each of said reference reflectors is provided as a reflector plate attached to the probe.

* * * * *